United States Patent Office 3,114,945
Patented Dec. 24, 1963

3,114,945
PROCESS OF OPERATION OF AND WINDOW FOR A HIGH-ACTIVITY CELL
Georges Bonnet, Grenoble, and Jean Petit, Villejuif, France, assignors to Commissariat a l'Energie Atomique
Filed Aug. 16, 1960, Ser. No. 50,024
Claims priority, application France Sept. 3, 1959
2 Claims. (Cl. 20—40)

The invention relates to a process of operation of and a window for a high activity cell. Operations on radioactive materials take place in special cells known as "high-activity cells," the walls of which constitute a strong protection against radiations. The operations are conducted by means of remote controls, remote manipulators and so on and the problem of observation can be solved either by the use of a periscope or by the use of television or by windows of large thickness.

The latter solution using windows of large thickness is most often utilised as it is the most practical. These windows should essentially satisfy two conditions: on the one hand, they should ensure satisfactory luminous transmission and, on the other hand, they should constitute an efficient protection. It is known to make windows corresponding with these conditions for example by using an aqueous solution of zinc bromide in a glazed frame or also by forming assemblies of blocks of glass. In the latter case, to ensure a protection equivalent to that of the walls of the cell without appreciably increasing the thickness of the window, lead glasses are used. These glasses constitute a good protection, but gamma radiations have the effect of colouring them and thus of opacifying them. This opacification can be partially remedied by the addition of a stabilizer, for example cerium ions. The property of such glasses of having a certain capacity for auto-regeneration of their optical characteristics can also be exploited.

The present invention takes advantage of this auto-regeneration property.

The window of the invention consists essentially of two identical slabs of glass located edge to edge in the same frame and displaceable by a translatory movement in the plane of the slabs, in front of an aperture or opening in the wall of the cell, and two protective screens surrounding the aperture at a distance from the wall sufficient to allow passage to the slabs of the glass, the first slab being in use in front of the aperture while the second is located behind one of the screens and vice versa.

A recess for receiving the glass slabs and screens may be formed in the wall of the cell. The recess may be provided in the internal or in the external surface or may even be in the form of an opening through the wall. In either case, the window aperture is located in the central portion of the recess.

Other characteristics and advantages of the invention will appear from the following description and the accompanying drawings, in which:

FIG. 4 is a partial sectional view on the line IV—IV of FIG. 2.

The invention is based on the fact that, for given glasses used to make windows of high activity cells and exposed to gamma radiation from radioactive materials which are contained in the cells, there is a threshold of intensity of radiation below which the glass does not discolour and even regenerates and above which the browning is cumulative. Gamma radiation through the glass undergoes an attenuation governed by the law:

$$I = I_0 \cdot e^{-\mu x}$$

where $I$ is the radiation in a region situated inside the glass, $I_0$ is the incident radiation, $\mu$ is the absorption factor, which depends upon the density of the glass and the energy of the gamma rays, and $x$ is the distance of the region considered from the face exposed to the incident radiation. This formula, which allows the thickness of the glass necessary for the protection to be calculated, shows that decrease in the intensity of the radiation in the glass is exponential.

If the intensity of the radiation, $I_0$, is higher than the discolouration threshold mentioned above, it appears necessary to change the glass periodically. Such a change is effected in certain cases, for cells where $I_0$ is of the order of $10^7$ roentgens/h., the browning threshold then being lower than this value. But as the slabs of glass currently used have a weight of the order of 1 ton and a high cost, the disadvantages of this operation can be readily appreciated. It thus appears more economical and more simple to utilise a device allowing the glass to "recover" in place.

According to the invention, different layers of the glass are located in the zones where alternatively they receive radiations respectively higher and lower than the intensity $I_s$, namely the discolouration threshold, in such a manner that none of the layers receives during too long an interval of time $t$, an integral dose higher than $$\int_0^t I_s \cdot dt$$

For a given thickness of glass traversed by the radiation, the thickness of the screens of lead flows from the preceding considerations and is a function of $I_0$, $\mu$ and the times of exposure and rest.

Figure 1:
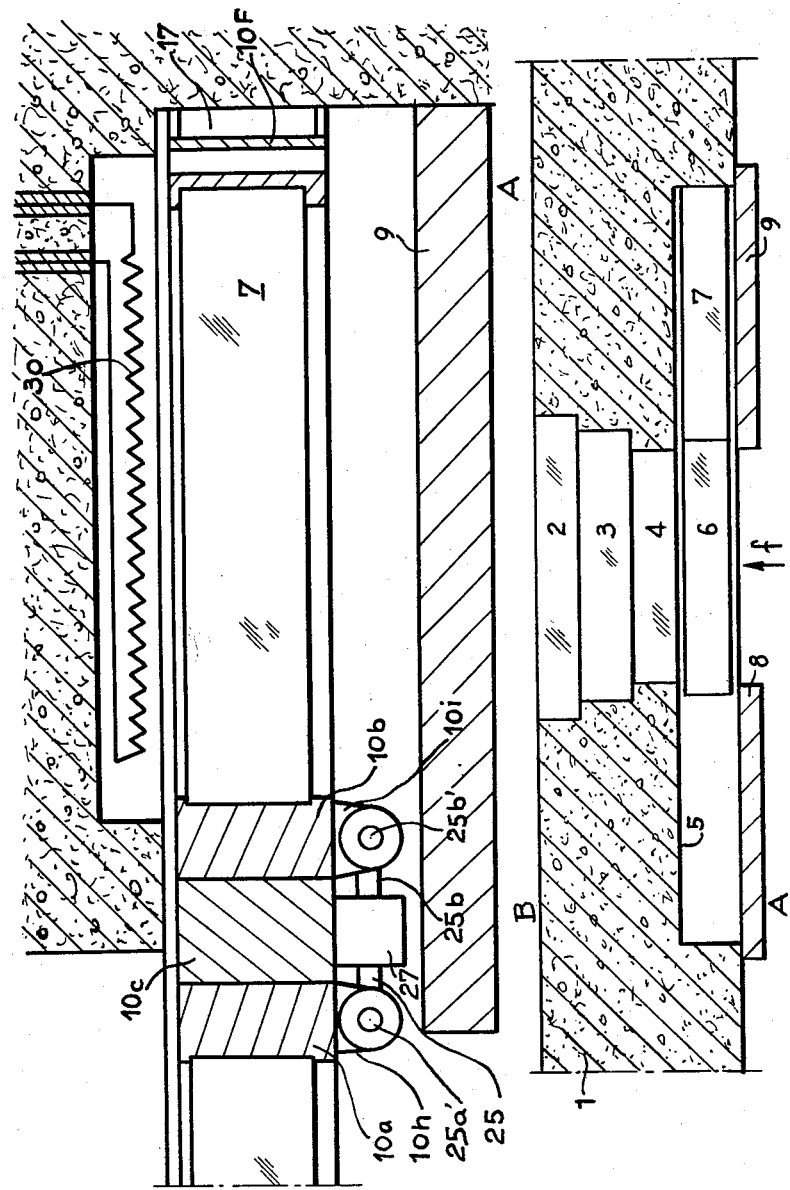
FIG. 1 shows diagrammatically the principle of the invention.

In FIG. 1, there is shown diagrammatically in horizontal section a window in accordance with the invention. This is incorporated in a concrete wall 1 of a high activity cell. The window comprises a fixed part, composed of slabs of glass such as 2, 3 and 4. Sealing between the interior A of the cell and the exterior B is ensured by appropriate means around the slabs. The radiation has an overall sense represented by the arrow $f$. A framework, disposed in an aperture 5 in the concrete wall and carrying two identical panes of glass 6 and 7, is capable of being displaced by a horizontal translatory movement. One or other of the panes can be placed in front of the fixed slabs 2, 3 and 4 to complete the structure of the window, the other pane then being situated behind a fixed protective screen, such as 8 or 9, made for example of lead. With the pane 6 exposed to the radiation $f$ and the pane 7 resting behind the screen 9, it is sufficient after an interval of time of about that at which browning of the pane 6 becomes obvious to displace the framework to move the pane 6 behind the screen 8 and bring the non-browned pane 7 into the active position. Protected by the screen 8, the pane 6 undergoes self-regeneration before being again exposed to the radiation.

Figure 2:
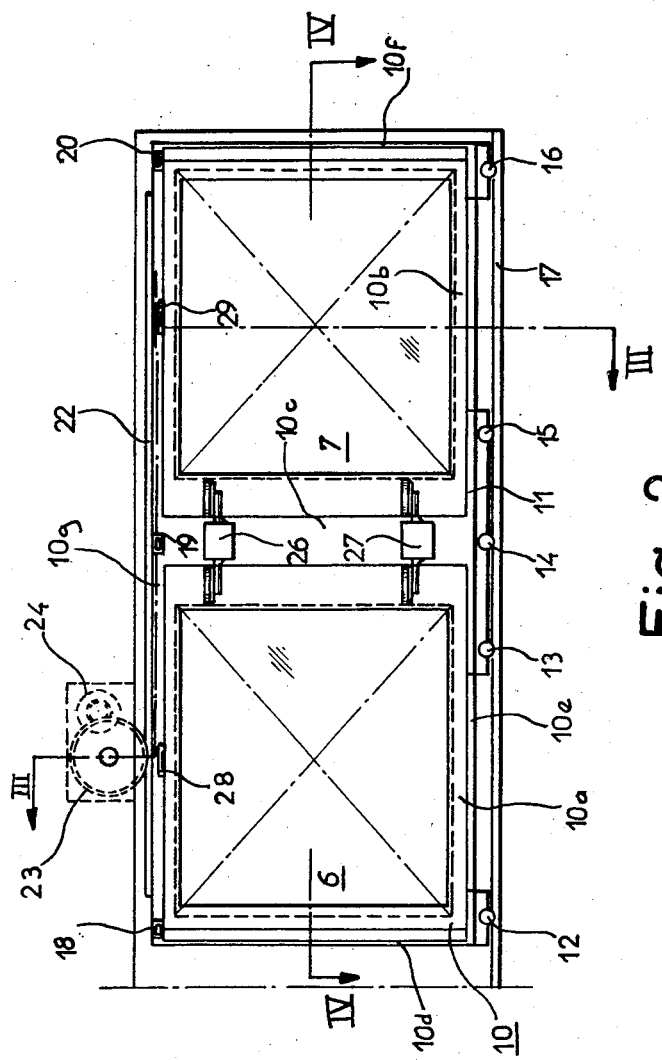
FIG. 2 is an elevational view showing the disposition of the frame provided with the two slabs of glass.
Figure 3:
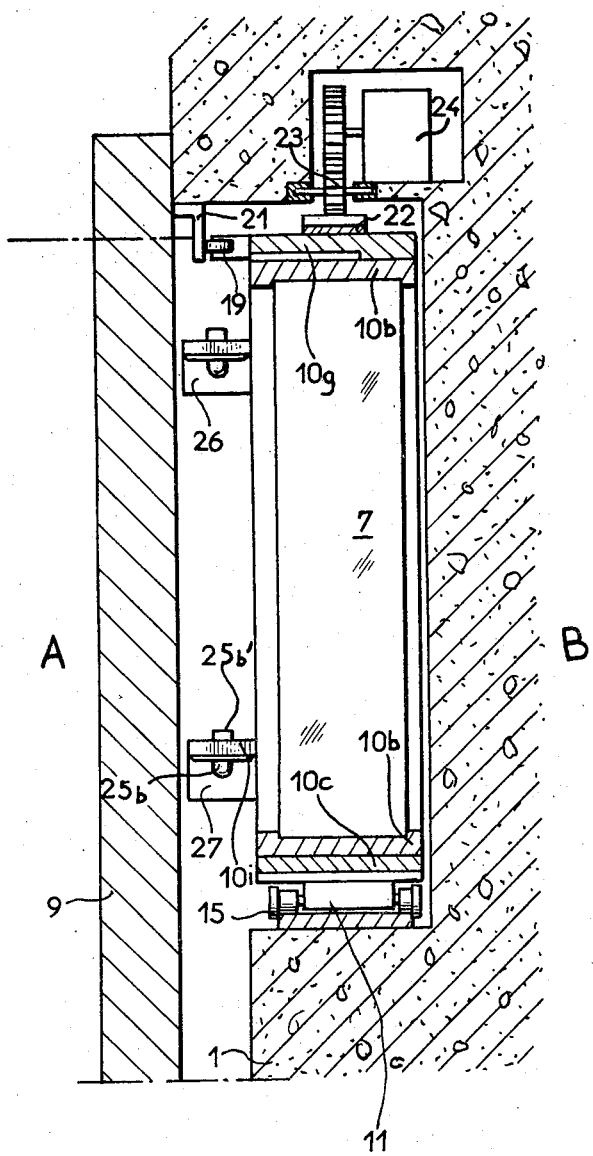
FIG. 3 is a sectional view of line III—III of FIG. 2.

As shown in FIGS. 2, 3 and 4, the framework 10 comprises two mountings 10a and 10b respectively containing the panes 6 and 7. Rollers such as 12, 13, 14, 15 and 16 permit displacement of the framework 10 on a roller track 17, and other rollers 18, 19 and 20 provide lateral guiding on a guide 21, which is omitted from FIG. 2 and shown in FIG. 3; a gear rack 22, mounted on the upper part of the frame to which it is connected, engages a toothed driving wheel 23 driven by an electric motor 24. The framework 10 comprises a vertical support 10c supporting double hinges, such as 26 and 27. The support 10c is extended as a frame 10d—e—f—g surrounding the mountings 10a and 10b and carrying on one side the supports such as 11 of the various lower rollers (12, 13, 14, 15, 16) and on the other side the upper rollers (18, 19 and 20). The mountings 10a and 10b are hinged around the support 10c by the hinges, which are disposed in such a manner that these mountings can be disengaged upwardly from the pins of the hinges. To raise or replace a pane of glass, it is sufficient to rotate it with its mounting through about a right-angle around the hinges 26 and 27. The window can then be disengaged by raising it by means of a lifting device acting on a hook, such as 28 or 29.

FIG. 4 shows more particularly how a double hinge such as 27 is made; the support 10c carries a block 25, on the two opposed lateral faces of which are two arms 25a and 25b carrying pivots 25a' and 25b', on which the respective arms 10h and 10i of the mountings 10a and 10b can rotate.

It is sufficient to operate the motor 24 periodically to displace the panes 6 and 7, the position of which can be fixed with precision, for example, by limiter contacts, and to have consequently at any time a window which affords, apart from a constant protection, stable optical properties.

In variants, the control can be hydraulic, pneumatic or even manual.

Heating systems 30 may be located in recesses of the wall formed behind the screens 8 and 9, one of such systems being shown in FIG. 4, and have the effect of accelerating the auto-regeneration of the glass.

It will be understood that the invention is not limited to the embodiment described and represented, which has been shown merely by way of example.

We claim:

1. In a high-activity cell and the like containing radioactive materials having a wall and a window aperture in said wall; a window assembly comprising a pair of substantially identical glass slabs securely assembled in edge to edge relation, gamma radiation absorbing screen means located in said cell parallel to said wall on opposite sides of and adjacent said aperture, said screen means reducing the gamma radiation level under the opacification threshold of said glass slabs and means for moving said glass slabs as a unit between a first position where one of said glass slabs is located between said screen means and said wall and the other of said slabs is located in front of said aperture and a second position where said other glass slab is in front of said window aperture and said first glass slab is located between said wall and the other of said screens, means for heating that one of said glass slabs which is protected from the radiation by the corresponding one of said screens, said heating means being located between each of said protective screens and said wall, whereby regeneration of the glass slab protected by said screen means against gamma radiation in said cell takes place while vision is maintained through the glass slab located in front of said aperture.

2. A window assembly as described in claim 1, including a recess in said wall having a central part thereof in coincidence with said window aperture, said two protective screens being located in said recess one on each side of said window aperture, and said moving means reciprocating said glass slabs in said recess from said first position where one of said glass slabs is protected by one of said screens to said second position where the other of said glass slabs is protected by the other of said screens.

References Cited in the file of this patent

UNITED STATES PATENTS

| 833,563 | Strata | Oct. 16, 1906 |
| 1,362,415 | Goss | Dec. 14, 1920 |
| 1,939,781 | Kelsey | Dec. 19, 1933 |
| 2,120,986 | Morris | June 21, 1938 |
| 2,519,514 | Thorp | Aug. 22, 1950 |
| 2,957,210 | Levenson | Oct. 25, 1960 |

FOREIGN PATENTS

| 515,651 | Italy | Feb. 16, 1955 |
| 555,085 | Belgium | Aug. 16, 1957 |